(12) United States Patent
Okabe et al.

(10) Patent No.: US 6,727,454 B2
(45) Date of Patent: Apr. 27, 2004

(54) GAS-INSULATED SWITCHGEAR

(75) Inventors: Mamoru Okabe, Hitachi (JP); Hitoshi Yamada, Hitachinaka (JP); Toshihisa Miyamoto, Hitachi (JP); Isamu Ozawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/253,923

(22) Filed: Sep. 25, 2002

(65) Prior Publication Data

US 2003/0141281 A1 Jul. 31, 2003

(30) Foreign Application Priority Data

Jan. 31, 2002 (JP) ........................................ 2002-022661

(51) Int. Cl.⁷ ............................................. H01H 33/70
(52) U.S. Cl. ............................. 218/43; 218/45; 218/80; 361/612
(58) Field of Search ............................. 218/43, 68, 44, 218/7, 4, 10, 13, 55; 361/601, 611, 612, 618

(56) References Cited

U.S. PATENT DOCUMENTS

| | | | | |
|---|---|---|---|---|
| 4,744,002 A | * | 5/1988 | Nakano et al. | 361/612 |
| 5,559,669 A | * | 9/1996 | Inami et al. | 361/612 |
| 6,134,101 A | * | 10/2000 | Bucher et al. | 361/612 |
| 6,188,034 B1 | * | 2/2001 | Tsuzura et al. | 218/43 |
| 6,399,911 B1 | * | 6/2002 | Tsuzura et al. | 218/43 |
| 6,510,046 B2 | * | 1/2003 | Arioka et al. | 361/612 |

FOREIGN PATENT DOCUMENTS

JP 2000050438 A * 2/2000 ............ H02B/13/02

* cited by examiner

Primary Examiner—Anh Mai
Assistant Examiner—M. Fishman
(74) Attorney, Agent, or Firm—Mattingly, Stanger & Malur, P.C.

(57) ABSTRACT

A gas-insulated switch gear has a plurality of bay units having bus ducts each containing a three-phase bus and connected by bellows expansion joints. When the bay unit needs to be inspected for maintenance, the bellows expansion joints are compressed, and only the bay unit can be pulled out of the gas-insulated switchgear.

5 Claims, 18 Drawing Sheets

GAS-INSULATED SWITCHGEAR

BACKGROUND OF THE INVENTION

The present invention relates to a gas-insulated switchgear and, more specifically, to a gas-insulated switchgear facilitating maintenance work.

The components including a bus duct and gas-insulated circuit breaker of a conventional gas-insulated switchgear are disassembled and examined individually for maintenance, such as periodic inspection, and are assembled individually after the completion of maintenance work. Thus, the maintenance of the conventional gas-insulated switchgear needs much time for disassembling and assembling the gas-insulated switchgear.

SUMMARY OF THE INVENTION

Accordingly, it is an object of the present invention to provide a gas-insulated switchgear facilitating maintenance work.

According to the present invention, a gas-insulated switchgear includes first three-phase buses, second three-phase buses, and a plurality of circuit breakers, wherein a bay unit is formed for each circuit breaker, the bay unit is provided with a bus duct housing the buses of the first and the second three-phase buses, and the bus ducts of the bay units are connected by bellows expansion joints.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENTS

Figure 1:
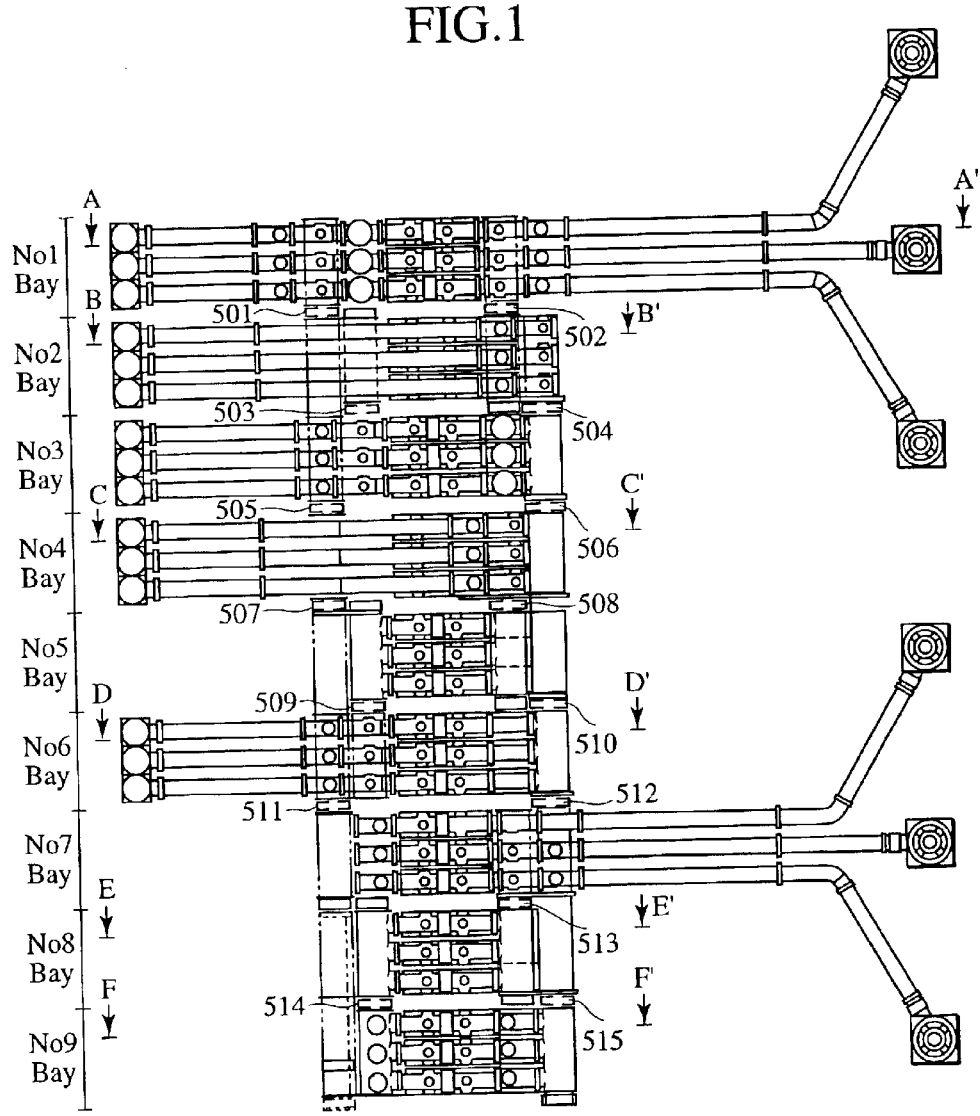
FIG. 1 is a top view of a gas-insulated switchgear in a preferred embodiment according to the present invention.
Figure 2:
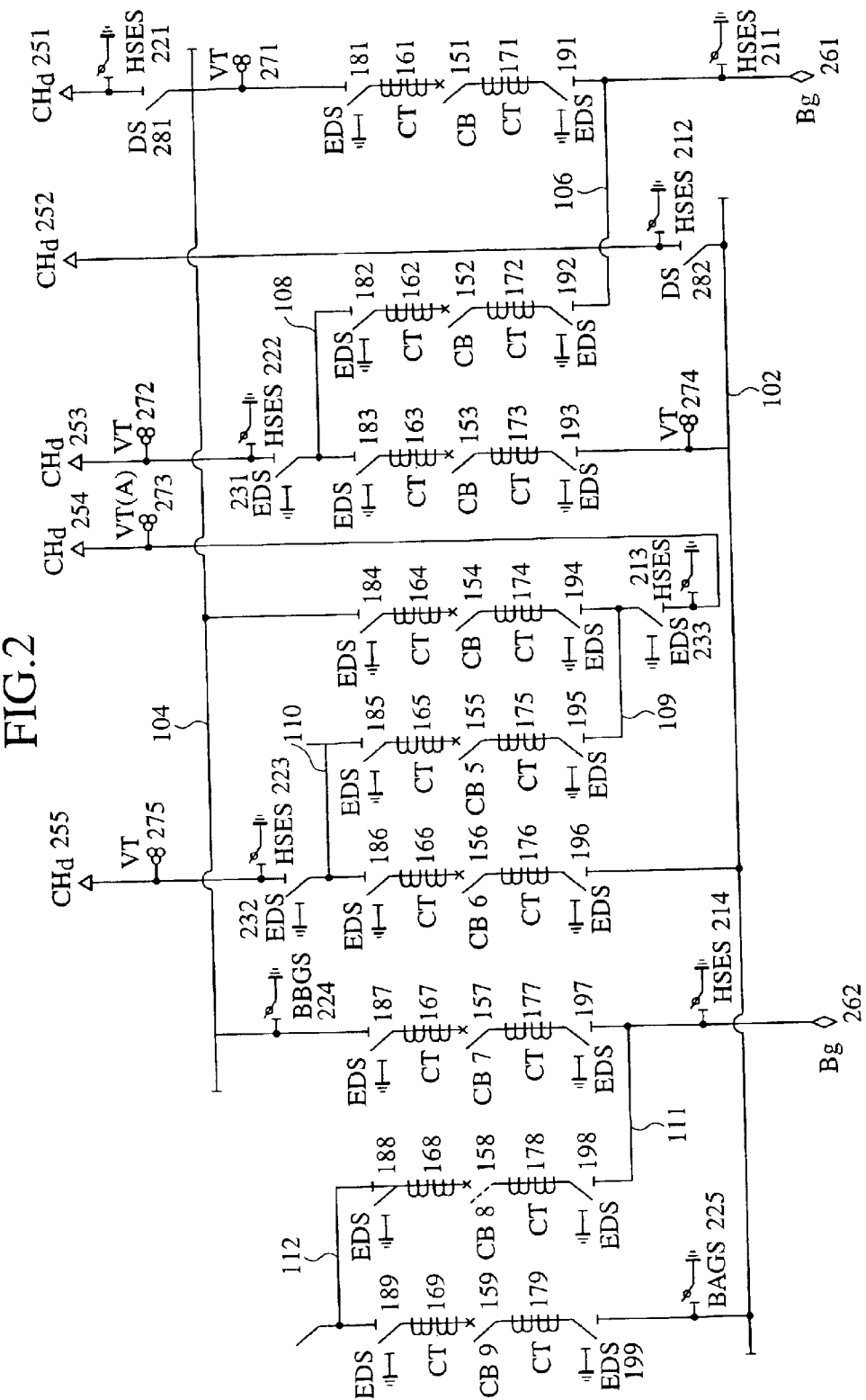
FIG. 2 is a circuit diagram of the gas-insulated switchgear shown in FIG. 1.

FIG. 1 is a top view of a gas-insulated switchgear (hereinafter abbreviated to "GIS") in a preferred embodiment according to the present invention, and FIG. 2 is a skeleton circuit diagram of the GIS shown in FIG. 1, in which lines for three phases are represented by single lines.

The GIS is an application of the present invention to a 1½ bus system. Cable heads (hereinafter abbreviated to "CHds") on the left side, as viewed in FIG. 1, are connected to a generator, not shown. Power generated by the generator is transmitted through bushings (hereinafter abbreviated to "Bgs") to the outside. Bays No. 1 to No. 9 are arranged along three-phase buses 102 and 104 and are connected by bellows expansion joints 501, 502, 503, 504, 505, 506, 507, 508, 509, 510, 511, 512, 513, 514 and 515.

Three gas-insulated circuit breakers (hereinafter abbreviated to GCBs") using $SF_6$ gas are connected electrically in series and are between the three-phase buses 102 and 104, and lines extending from points between the GCBs are connected to the CHds and Bgs. Three-position earth disconnecting switches (hereinafter, abbreviated to "EDSs") are connected through metering current transformers (hereinafter, abbreviated to "CTs") to the opposite sides of GCBs, respectively. A conductor connecting the GCB to the CHd or a conductor connecting the GCB to the Bg is provided with a high-speed earth switch (hereinafter, abbreviated to "HSES") and a metering voltage transformer (hereinafter, abbreviated to "VT").

Figure 3:
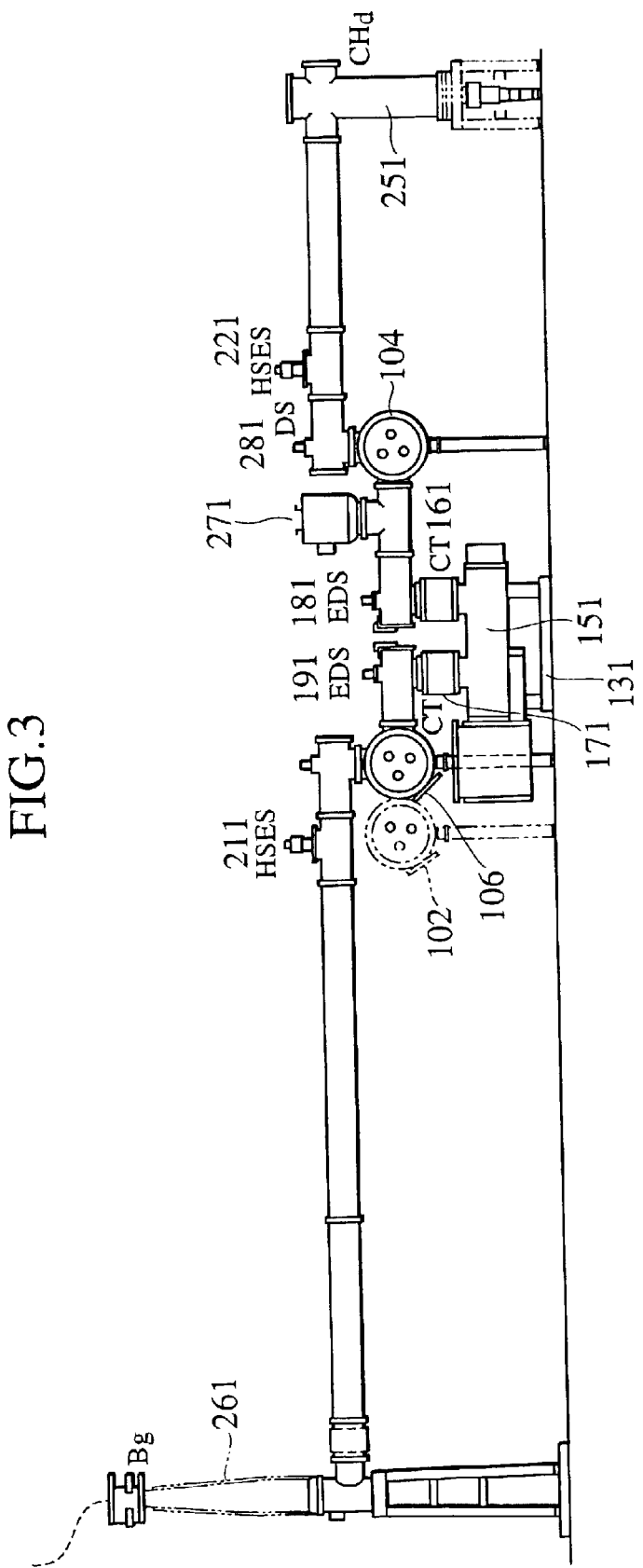
FIG. 3 is a sectional view taken on line A–A' in FIG. 1.

Referring to FIG. 3 showing the bay unit No. 1, busbars extend from the CHds 251 of the three phases connected to the generator. The busbars of the three phases are connected through the HSESs 221 to a three-phase bus 104. As shown in FIG. 3, the busbars of the three-phase bus 104 are extended in a triangular arrangement, the busbars of the three phases are extended horizontally and are connected through a VT 281 to an EDS 181. Busbars are extended vertically from the EDS 181 and are connected through a CT 161 to a single-phase GCB 151 disposed in a horizontal position. Busbars are extended vertically from the GCB 151 and are connected through a CT 171 to an EDS 191. Busbars of the three-phases are extended horizontally from the EDS 191 and are connected to the three-phase bus 106 connected to a GCB 152 included in the bay No. 2. Each of busbars extended from the three-phase bus 106 is connected through a HSES 211 to a Bg 261.

The GCB 151 is mounted on a base 131. GCBs included in the bay units No. 2 to No. 9 are mounted on bases, respectively. Bus ducts containing the three-phase buses 102, 104 and 106 are supported by support members on the floor.

Figure 4:
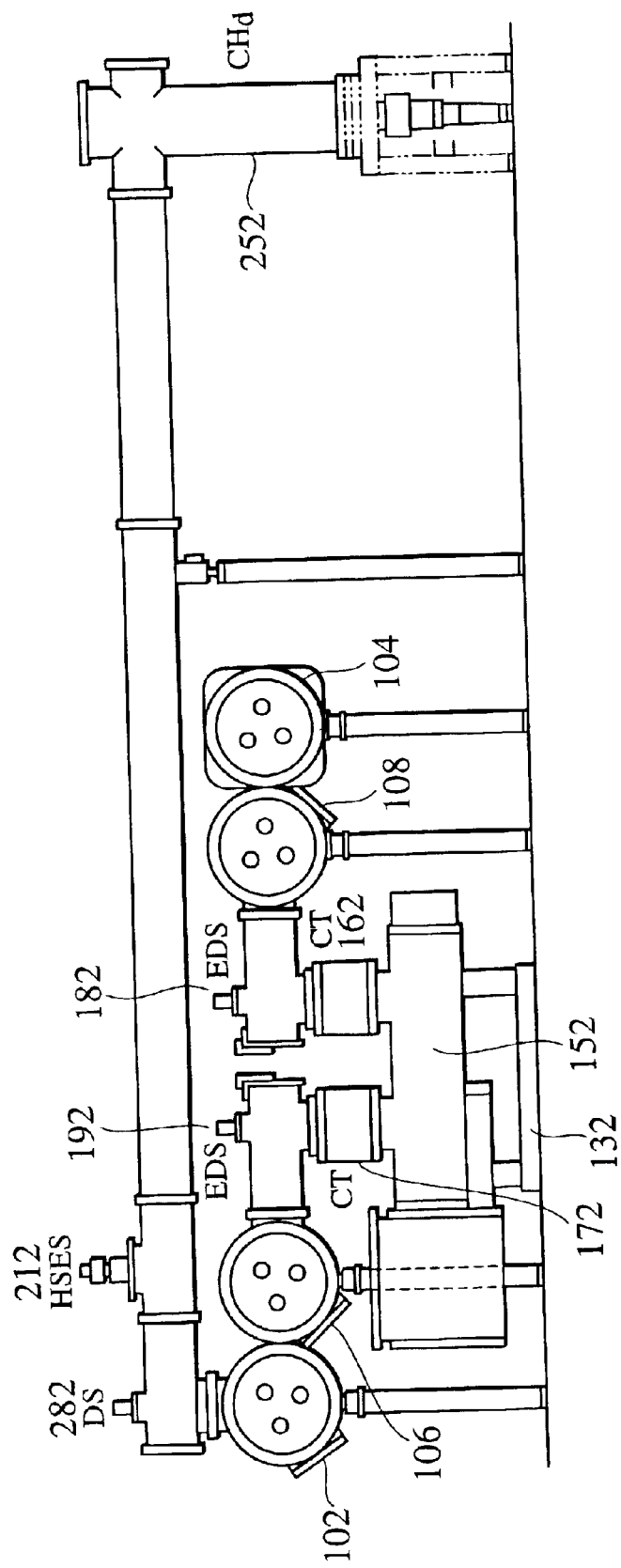
FIG. 4 is a sectional view taken on line B–B' in FIG. 1.

Referring to FIG. 4, the bay unit No. 2 has busbars extended from CHds 252 for three phases connected to the generator, not shown, are connected through HSESs 212 and disconnecting switches (hereinafter, abbreviated to "DSs") 282 to the three-phase bus 102.

Busbars of the three phases horizontally extended from the three-phase bus 106 are connected to EDSs 192. Busbars vertically extended from the EDSs 192 are connected through a CT 172 to a GCB 152. Busbars vertically extended from the GCB 152 are connected to a CT 162, and busbars horizontally extended from the CT 162 is connected through an EDS 182 to a three-phase bus 108. In the bay unit No. 2, the three-phase buses 102 and 104 are not connected to the GCB 152.

Figure 5:
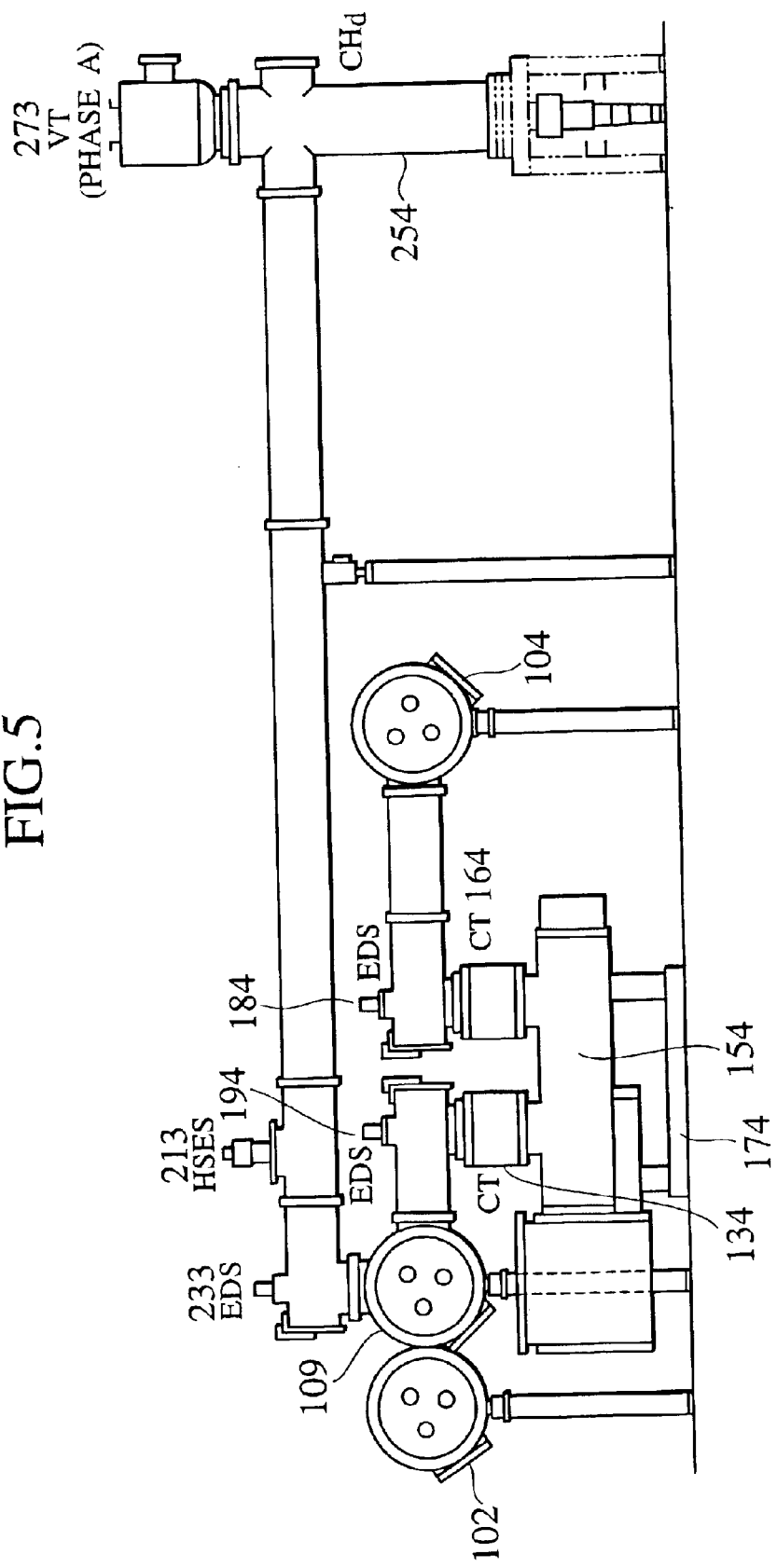
FIG. 5 is a sectional view taken on line C–C' in FIG. 1.

Referring to FIG. 5, the bay unit No. 4 has busbars extended vertically from CHds 254 of the three phases connected to the generator, not shown. Busbars are extended horizontally from a VT 273. The busbars are connected through a HSES 213 and EDS 233 to the busbars of a three-phase bus 109. Busbars are extended horizontally from the three-phase bus 109 of the bay unit No. 4 to an EDS 194, and busbars are extended vertically downward from the EDS 194 and are connected through a CT 134 to a GCB 154. Busbars for the three phases are extended vertically from the GCB 154 to an EDS 184. Busbars horizontally extended from the EDS 184 are connected to the busbars of the three-phase bus 104. In the bay unit No. 4, the three-phase bus 102 is not connected to the GCB 154.

Figure 6:
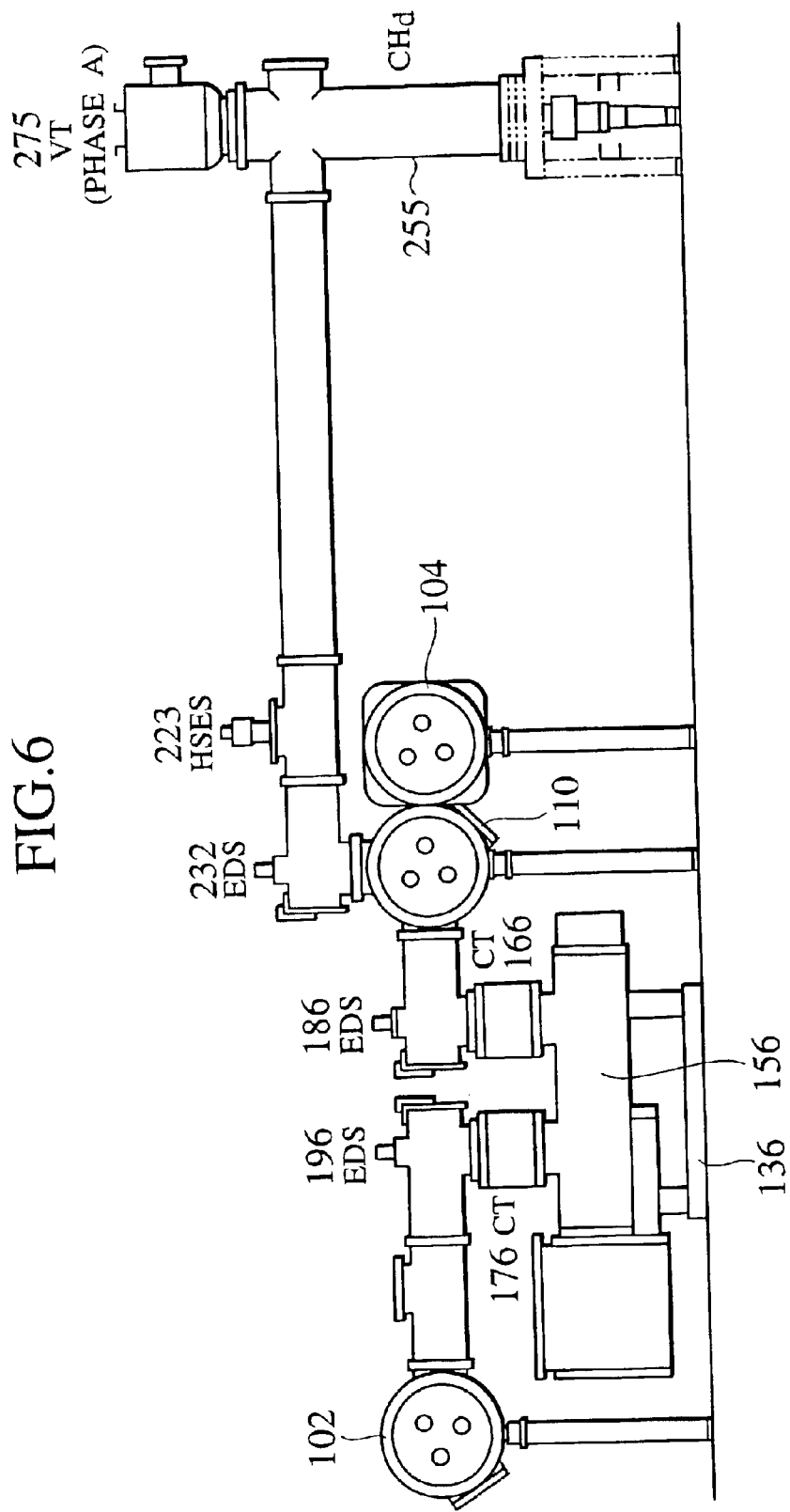
FIG. 6 is a sectional view taken on line D–D' in FIG. 1.

Referring to FIG. 6, the bay unit No. 6 has busbars for the three phases vertically extended from CHds 255 for the three phases to a VT 275. Busbars horizontally extended from the VT 275 is connected through a HSES 223 and an EDS 232 to the busbars of a three-phase bus 110, respectively. Busbars are extended horizontally to an EDS 186. Busbars extended vertically downward from the EDS 186 are connected through a CT 166 to a GCB 156. Busbars vertically extended from the GCB 156 are connected through a CT 176 and an EDS 196 to the conductors for the three phases of the three-phase bus 102, respectively. In the bay unit No. 6, the three-phase bus 104 is not connected to the GCB 156.

Figure 7:
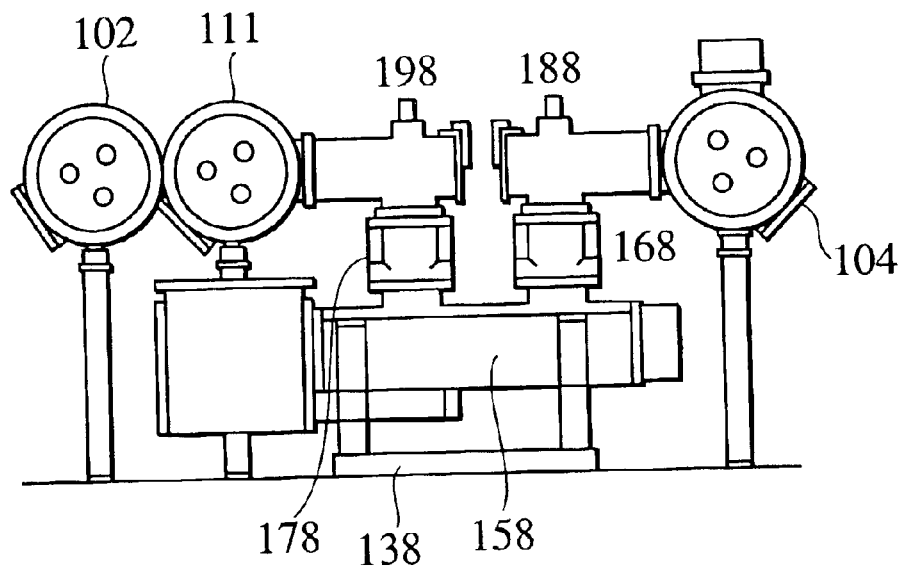
FIG. 7 is a sectional view taken on line E–E' in FIG. 1.

Referring to FIG. 7 showing the bay unit No. 8, busbars are extended horizontally from the three-phase bus 104 to an EDS 188. Busbars extended vertically downward from the EDS 188 are connected through a CT 168 to a GCB 158. Busbars extended vertically from the GCB 158 are extended through a CT 178 to an EDS 198. Busbars horizontally extended from the EDS 198 are connected to the busbars of a three-phase bus 111, respectively. Thus, the busbars for the three phases of the three-phase bus 104 are connected to the corresponding busbars of the three-phase bus 111, respectively. In the bay unit No. 8, the three-phase bus 102 is not connected to the GCB 158.

Figure 8:
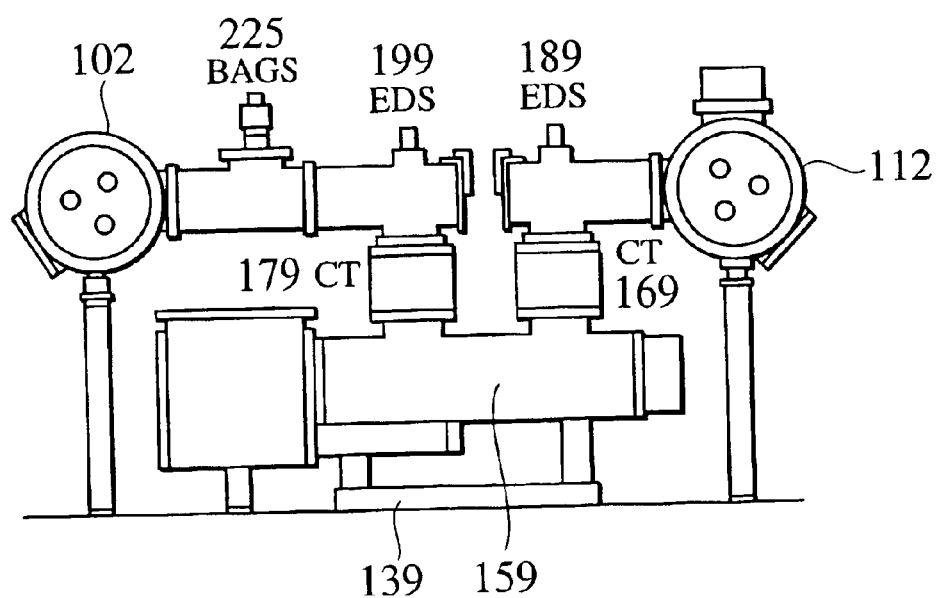
FIG. 8 is a sectional view taken on line F–F' in FIG. 1.

Referring to FIG. 8 showing the bay unit No. 9, busbars are extended horizontally from a three-phase bus 112 to an EDS 189. Busbars extended vertically downward are connected through a CT 169 to a GCB 159. Busbars vertically extended from the GCB 159 is connected through a CT 179 and an EDS 199 to a BAGS 225. Busbars horizontally extended from the BAGS 252 are connected to the busbars of the three-phase bus 102. Thus, the busbars of the three phases of the three-phase bus 112 are connected to the corresponding busbars of the three-phase bus 102.

Figure 9:
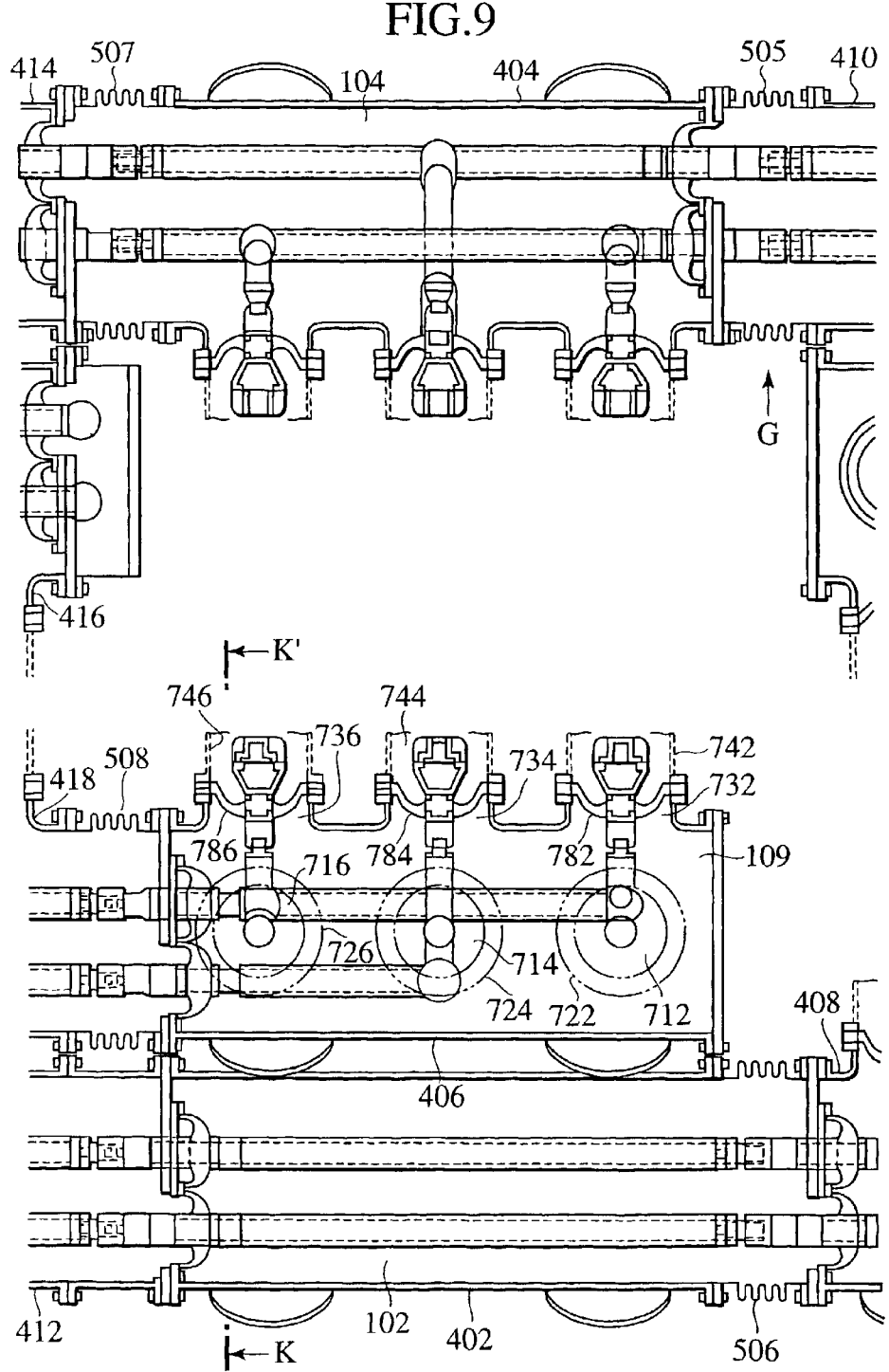
FIG. 9 is a perspective view of three-phase buses included in a bay unit No. 4 shown in FIG. 1.

FIG. 9 is a perspective view of the three-phase buses 102, 104 and 109 in the bay unit No. 4, in which the GCB 154 is omitted.

The three-phase bus 192 contained in a bus duct 402 has busbars 311, 312 and 313, which are extended in a triangular arrangement. The busbar 311 is extended in a horizontal plane including the center axis of the bus duct 402, and the busbar 312 is at a level above that of the busbar 313. A side between the busbars 312 and 313 on the side of the GCB 154 of a triangle having vertices corresponding to the busbars 311, 312 and 313 is perpendicular to a horizontal plane. The three-phase bus 102 extends through the bay units No. 1 to No. 9, and is contained in bus ducts 408 and 412 respectively included in the bay units No. 3 and No. 5.

The three-phase bus 109 is contained in bus ducts 406 and 418 respectively included in the bay units No. 4 and No. 5. The three-phase bus 109 has busbars 321, 322 and 323, which are extended in a triangular arrangement. The busbar 321 is extended in a horizontal plane including the center axes of the bus ducts 406 and 418, and the busbar 322 is at a level above that of the busbar 323. A side on the side of the GCB 154 of a triangle having vertices corresponding to the busbars 321, 322 and 323 is perpendicular to a horizontal plane. The busbars 321, 322 and 323 contained in the bus duct 406 are branched into horizontal branch busbars connected to the GCB 154, and vertical branch busbars connected to the CHd 254.

The three-phase bus 104 has busbars 301, 302 and 303, and extends through the bay units No. 1 to No. 8. The busbars 301, 302 and 303 are extended in a triangular arrangement. The busbar 301 is extended in a horizontal plane including the center axis of the bus duct 404, the busbar 302 is at a level above that of the busbar 303. A side between the busbars 302 and 303 on the side of the GCB 154 of a triangle having vertices corresponding to the busbars 301, 302 and 303 is perpendicular to a horizontal plane.

The bus ducts 402 and 408 are connected by a bellows expansion joint 506, the bus ducts 406 and 418 are connected by a bellows connector 508, and the bus duct 404 is connected to the bus ducts 410 and 414 by bellows expansion joints 505 and 507, respectively.

Whereas the bus ducts 402 and 412 are not connected by a bellows expansion joint, the bus duct 412 is connected to a bus duct containing the three-phase bus 102 of the bay unit No. 6 by a bellows expansion joint 510.

Figure 10:
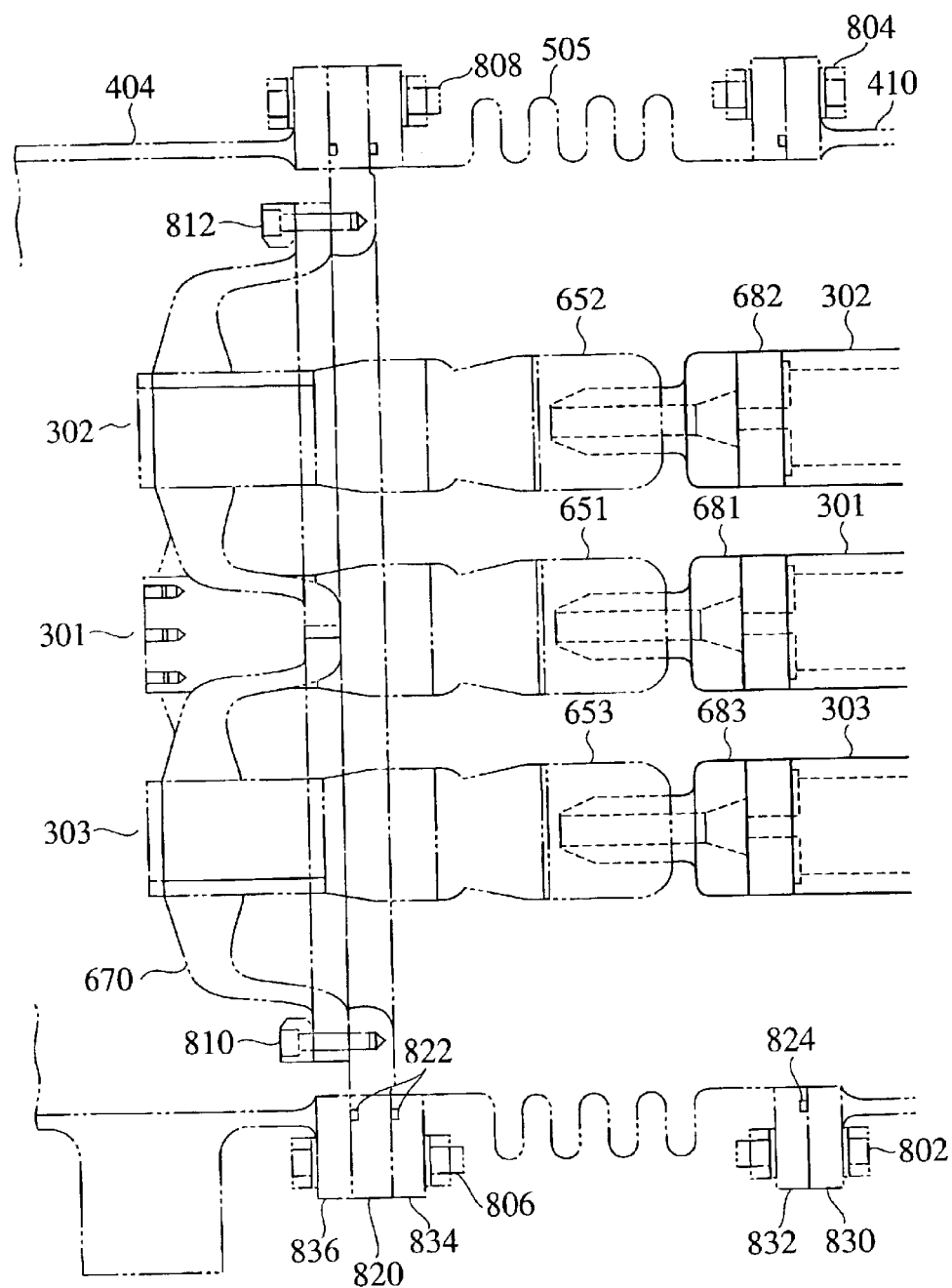
FIG. 10 is a sectional view of a bellows expansion joint employed in the gas-insulated switchgear shown in FIG. 1 for connecting bus ducts.

FIG. 10 shows, by way of example, the bellows expansion joint 505 shown in FIG. 9 in a view taken in the direction of the arrow G in FIG. 9.

The bellows expansion joint 505 is formed of a stainless steel and is provided with flanges 832 and 834 at the opposite ends thereof, respectively. The flange 832 is fastened to a flange 830 included in the bus duct 410 with a gasket 824 held between the flanges 832 and 830 with bolts 802 and nuts to form an airtight structure capable of holding $SF_6$ gas. The flange 834, a flange 836 included in the bus duct 404, a spacer-holding plate 820 and gaskets 822 are fastened together with bolts 806 and nuts to form an airtight structure capable of holding $SF_6$ gas.

The busbars 301, 302 and 303 extended in the bus duct 410 are connected electrically to the busbars 301, 302 and 303 extended in the bus duct 404 by an expansion joint 681 and a collector 651, an expansion joint 682 and a collector 652, and an expansion joint 683 and a collector 653, respectively. The busbars 301, 302 and 303 contained in the bus duct 404 are supported by a spacer 670. The spacer 670 is fastened to the spacer support plate 820 with bolts 810. The collectors 651, 652 and 653 are joined to the busbars 301, 302 and 303 supported by the spacer 670. thus, the busbars 301, 302 and 303 are fixedly supported in the bellows expansion joint connecting the bus ducts 410 and 404.

A disconnecting procedure for disconnecting the bay unit No. 4 from the adjacent bay unit will be described. The bolts 806 are unfastened and removed to separate the spacer support plate 820 from the flange 834. Bolts are extended between bolt holes formed in the flange 834 of the bellows expansion joint 505, and bolt holes formed in the flange 832 of the bellows expansion joint 505 and not occupied by any bolts, nuts are screwed on the bolts to contract the bellows expansion joint 505 so that the distance between the flanges 832 and 834 is reduced and the flange 834 of the bellows expansion joint 505 is spaced from the spacer support plate 820. Then, the collectors 651, 652 and 653 are removed to disconnect the busbars 301, 302 and 303 contained in the bus duct 404 from those contained in the bus duct 410 in the bellows expansion joint 505.

The same disconnecting procedure is performed for the bellows expansion joints 506, 507, 508 and 510 to form gaps between the bus ducts 404, 406 and 402, and the bus ducts of the bay units No. 3 and No. 6 with the bus duct 404 connected to the bus ducts 410 and 414 of the bay units No. 3 and No. 5, the bus duct 406 connected to the bus duct 418 of the bay unit No. 5, and the bus duct 402 connected to the bus duct 412. Thus, only the bay unit No. 4 can be dismantled without moving the bay units No. 3, No. 5 and No. 6, so that the maintenance of the GIS can be easily carried out. Although the bay unit No. 4 is dismantled with the bus ducts 402 and 412 joined together in this embodiment, the bus ducts 402 and 412 may be connected by a bellows expansion joint, and the bus ducts 402 and 412 may be disconnected.

An arrangement for extending branch busbars from the three-phase bus of the GIS in the this embodiment will be described in connection with the bus duct 406 by way of example.

Figure 11:
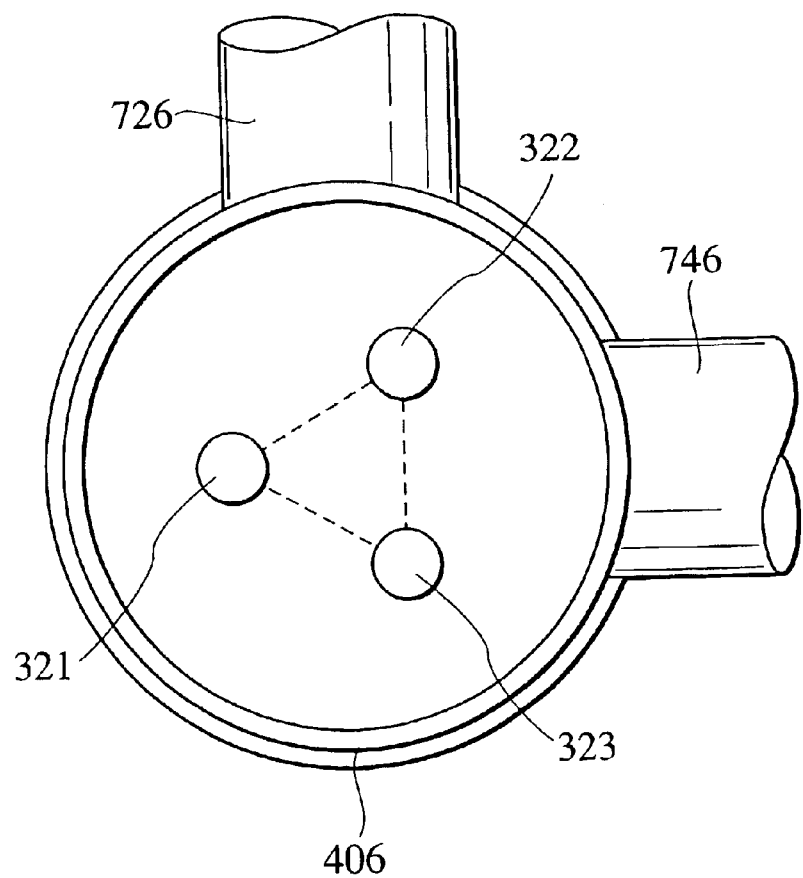
FIG. 11 is a sectional view taken on line K–K' in FIG. 9.
Figure 12:
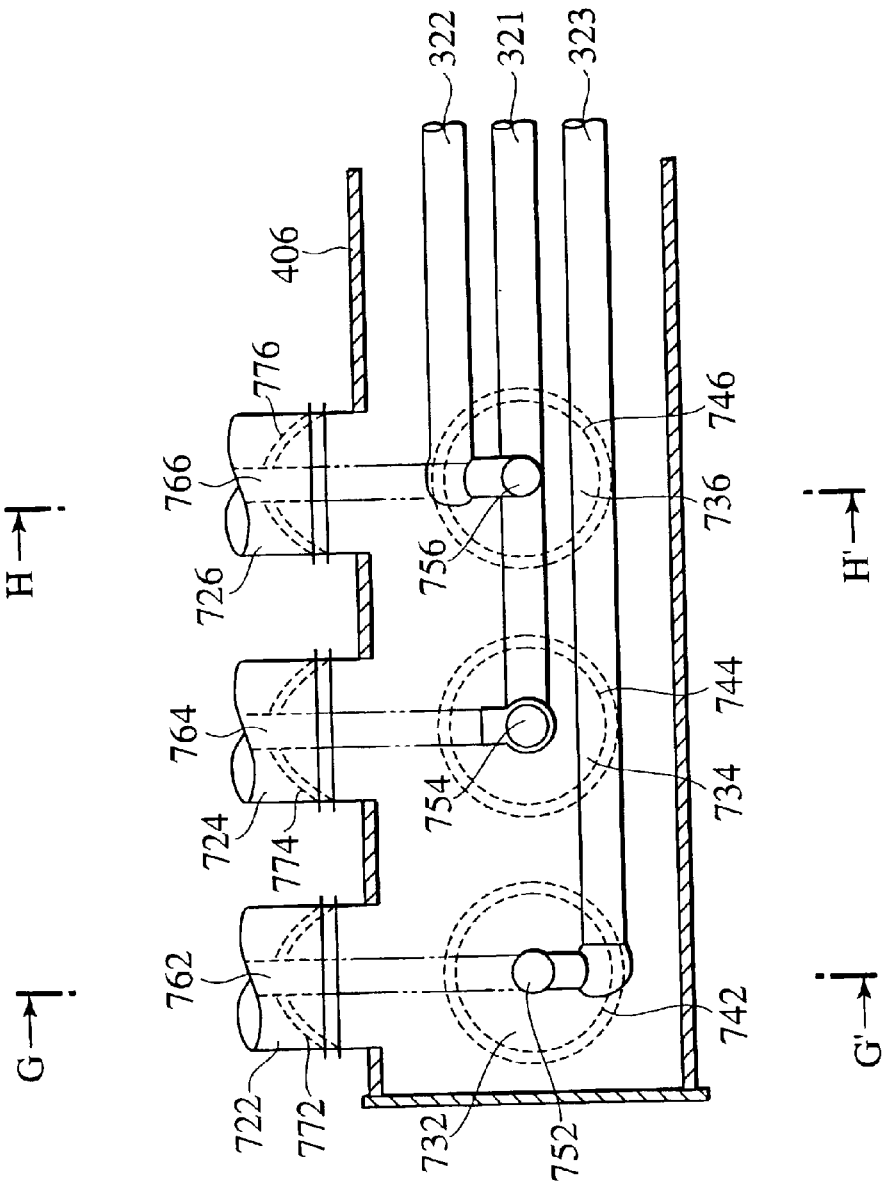
FIG. 12 is a sectional view of a bus duct as viewed from the side of a gas-insulated circuit breaker.
Figure 13:
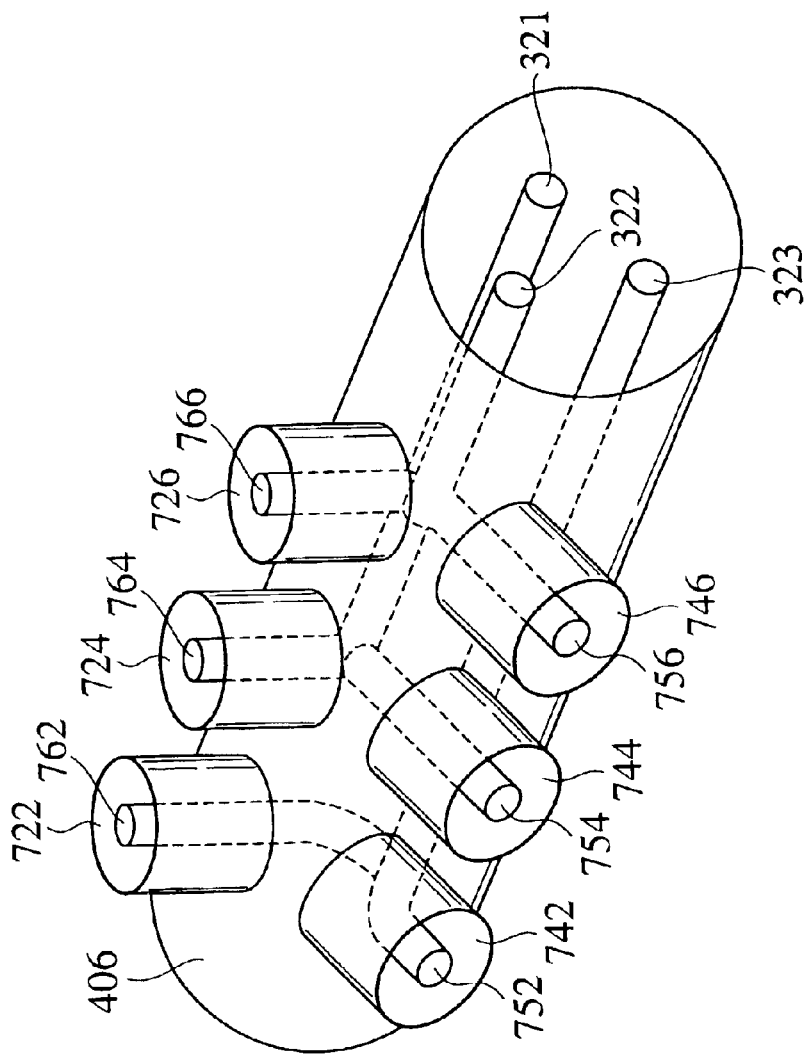
FIG. 13 is a perspective view of the bus duct shown in FIG. 12.

FIG. 11 is a sectional view taken on line K–K' in FIG. 9, FIG. 12 is a sectional view of the bus duct 406 as viewed from the side of the GCB 154, and FIG. 13 is a perspective view of the bus duct 406 shown in FIG. 12.

Three upper exits 712, 714 and 716 are formed in a longitudinal arrangement parallel to the axis of the bus duct 406 in an upper part of the bus duct 406. Vertical branch pipes 722, 724 and 726 are attached to the upper part of the bus duct 406 so as to surround busbars extending through the EDS 233 to the CHd 254. The vertical branch pipes 722, 724 and 726 are provided with flanges fastened to those of the bus duct 406 with bolts.

Three side exits 732, 734 and 736 are formed in a longitudinal arrangement parallel to the axis of the bus duct 406 in a side part of the bus duct 406 spaced an angular interval of about 90° from the upper part in which the upper exits 712, 714 and 716 are formed. The respective axial positions of the upper exits 712, 714 and 716 correspond to those of the side exits 732, 734 and 736, respectively. Horizontal branch pipes 742, 744 and 746 are attached to the side part of the bus duct 406 so as to surround busbars extending from the side exits 732, 734 and 736 through the EDS 197 to the GCB 154. The horizontal branch pipes 742, 744 and 746 are provided with flanges fastened to those of the bus duct 406 with bolts. The horizontal branch pipes 742, 744 and 746 are indicated by broken lines in FIG. 12.

The busbars 321, 322 and 323 for the three phases are extended in the bus duct 406 and are supported on an insulating spacer at positions corresponding to the vertices of an isosceles triangle as shown in FIG. 11. Insulating spacers arranged longitudinally in the bus duct 406 are omitted. Thus, the distance between the busbars 321 and 323 and the distance between the busbars 321 and 233 are equal. The busbars 322 and 323 are disposed such that a side, extending between the busbars 322 and 323, of the isosceles triangle is substantially parallel to the side exit 736; that is, the busbars 322 and 323 are disposed on a substantially vertical line parallel to the axis of the upper exit 716. The busbar 322 is disposed on the highest vertex nearest to the upper exit 716, the busbar 321 is at a level lower than that of the busbar 322, and the busbar 323 is at a level lower than that of the busbar 321.

The highest busbar 322 at the highest vertex of the isosceles triangle is branched into a vertical branch busbar 766 and a horizontal branch busbar 756 at a position corresponding to the side exit 736 and the upper exit 716 of the bus duct 406. The vertical branch busbar 766 is supported by a spacer 776 and is extended through the vertical branch pipe 726, and the horizontal branch busbar 756 is supported by a spacer 786 and is extended through the horizontal branch pipe 746.

The busbar 321 at the middle vertex of the isosceles triangle is branched into a vertical branch busbar 764 and a horizontal branch busbar 754 at a position corresponding to the side exit 734 and the upper exit 714 of the bus duct 406. The vertical branch busbar 764 is supported by a spacer 774 and is extended through the vertical branch pipe 724, and the horizontal branch busbar 754 is supported by a spacer 784 and is extended through the horizontal branch pipe 744.

The busbar 323 at the lowest vertex of the isosceles triangle is branched into a vertical branch busbar 762 and a horizontal branch busbar 752 at a position corresponding to the side exit 732 and the upper exit 712 of the bus duct 406. The vertical branch busbar 762 is supported by a spacer 772 and is extended through the vertical branch pipe 722, and the horizontal branch busbar 752 is supported by a spacer 782 and is extended through the horizontal branch pipe 742.

As shown in FIG. 13, the busbar 322 is extended to and is branched into the vertical and the horizontal branch busbar at a position corresponding to the upper exit 716 and the side exit 736, the busbar 321 is extended to and is branched into the vertical and the horizontal branch busbar at a position corresponding to the upper exit 714 and the side exit 734, and the busbar 323 is extended to and is branched into the vertical and the horizontal branch busbar at a position corresponding to the upper exit 712 and the side exit 732.

Figure 14:
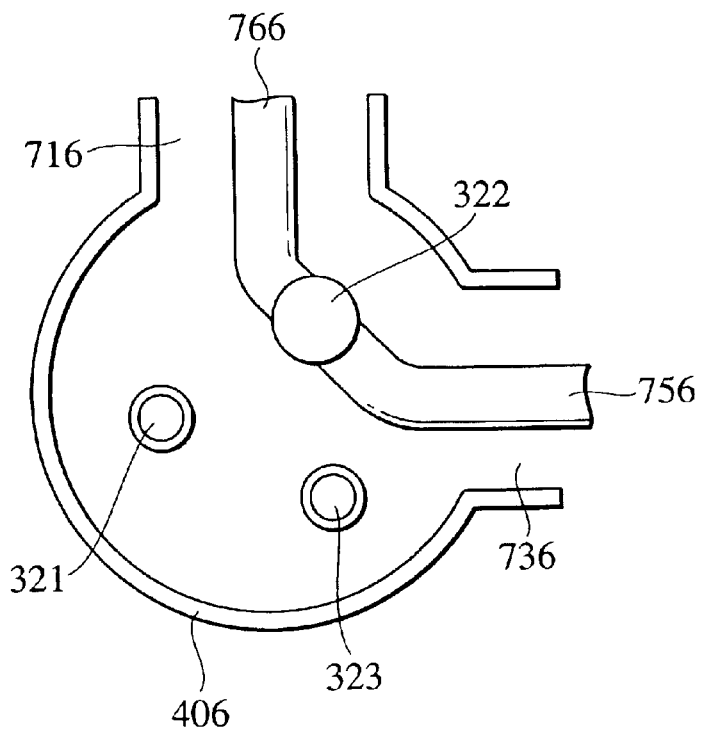
FIG. 14 is a sectional view taken on line H–H' in FIG. 12.

FIG. 14 is a sectional view of the bus duct 406 taken on line H–H' in FIG. 12. The vertical branch busbar 766 and the horizontal branch busbar 756 extend from the busbar 322. The vertical branch busbar 766 is connected through the EDS 233 to the CHd 254, and the horizontal branch busbar 756 is connected through the EDS 197 to the GCB 154.

Figure 15:
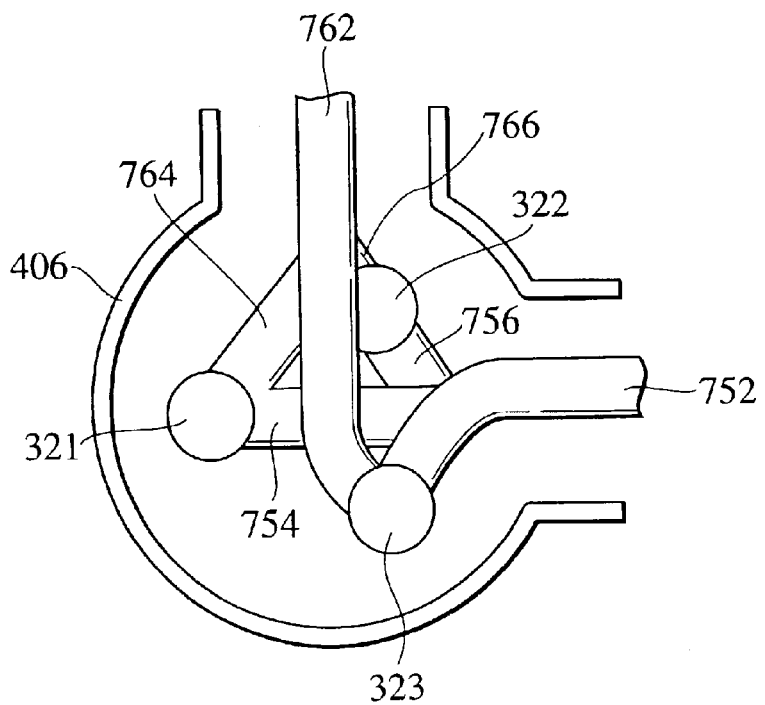
FIG. 15 is a sectional view taken on line G–G' in FIG. 12.

FIG. 15 is a sectional view of the bus duct 406 taken on line G–G' in FIG. 12. The vertical branch busbar 764 and the horizontal branch busbar 754 extend from the busbar 321. The vertical branch busbar 764 and the horizontal branch busbar 754 are connected to the CHd and the GCB, respectively. The vertical branch busbar 762 and the horizontal branch busbar 752 extend from the busbar 323. The vertical branch busbar 762 and the horizontal branch busbar 752 are connected to the CHd and the GCB, respectively.

Thus, the three upper exits are formed in the upper part of the cylindrical bus duct in the longitudinal arrangement, the three side exits are formed in the side part of the bus duct at positions corresponding to those of the upper exits, respectively, the three busbars for the three phases are extended so as to correspond to the vertices of the triangle having one side substantially parallel to the side exits, the three busbars are branched into the vertical branch busbars and the horizontal branch busbars at positions corresponding to the three upper exits, respectively, the vertical branch busbars are extended through the upper exits, respectively, and the horizontal branch busbars are extended through the side exits, respectively.

In the GIS embodying the present invention, the busbars of the three-phase buses, such as the three-phase bus 106 of the bay unit No. 1, as well as those of the three-phase bus 109 of the bay unit No. 4 are branched into vertical and horizontal branch busbars in the bus ducts of lengths corresponding to those of the corresponding by units. Since the busbars of the three-phase bus are spaced a distance sufficient for insulation apart from each other and are branched into the vertical and the horizontal branch busbars, any connecting bay unit, or a bus duct and busbars, which are needed by the conventional GIS for branching the busbars is unnecessary and the GIS has compact construction and needs a small area for installation.

Figure 16:
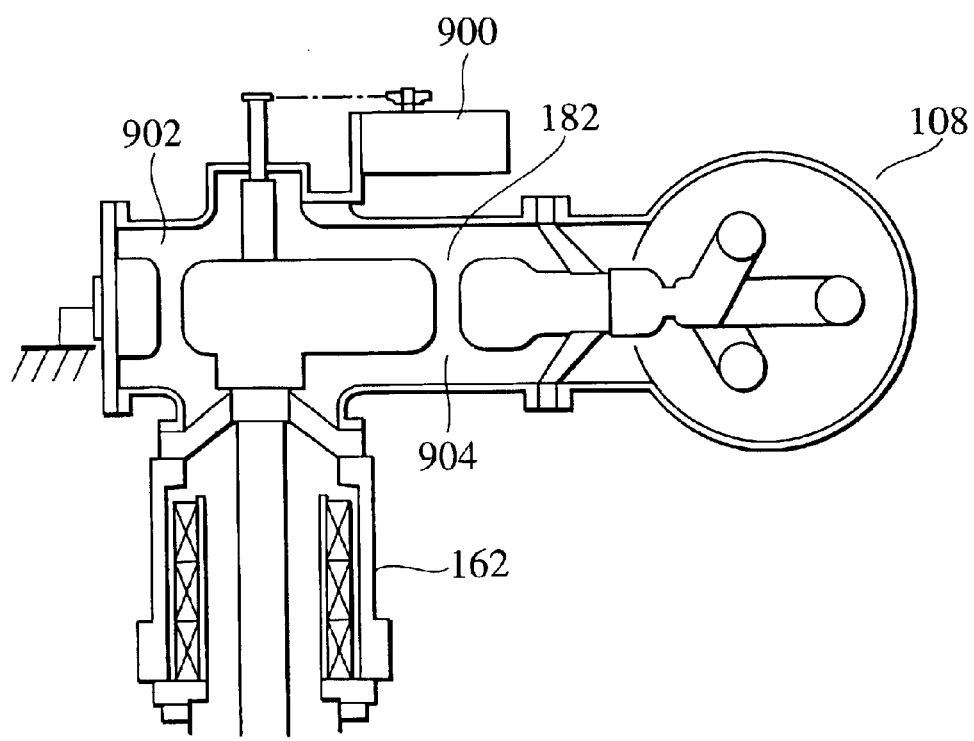
FIG. 16 is a sectional view of a three-position earth disconnecting switch employed in a gas-insulated switchgear embodying the present invention.
Figure 17:
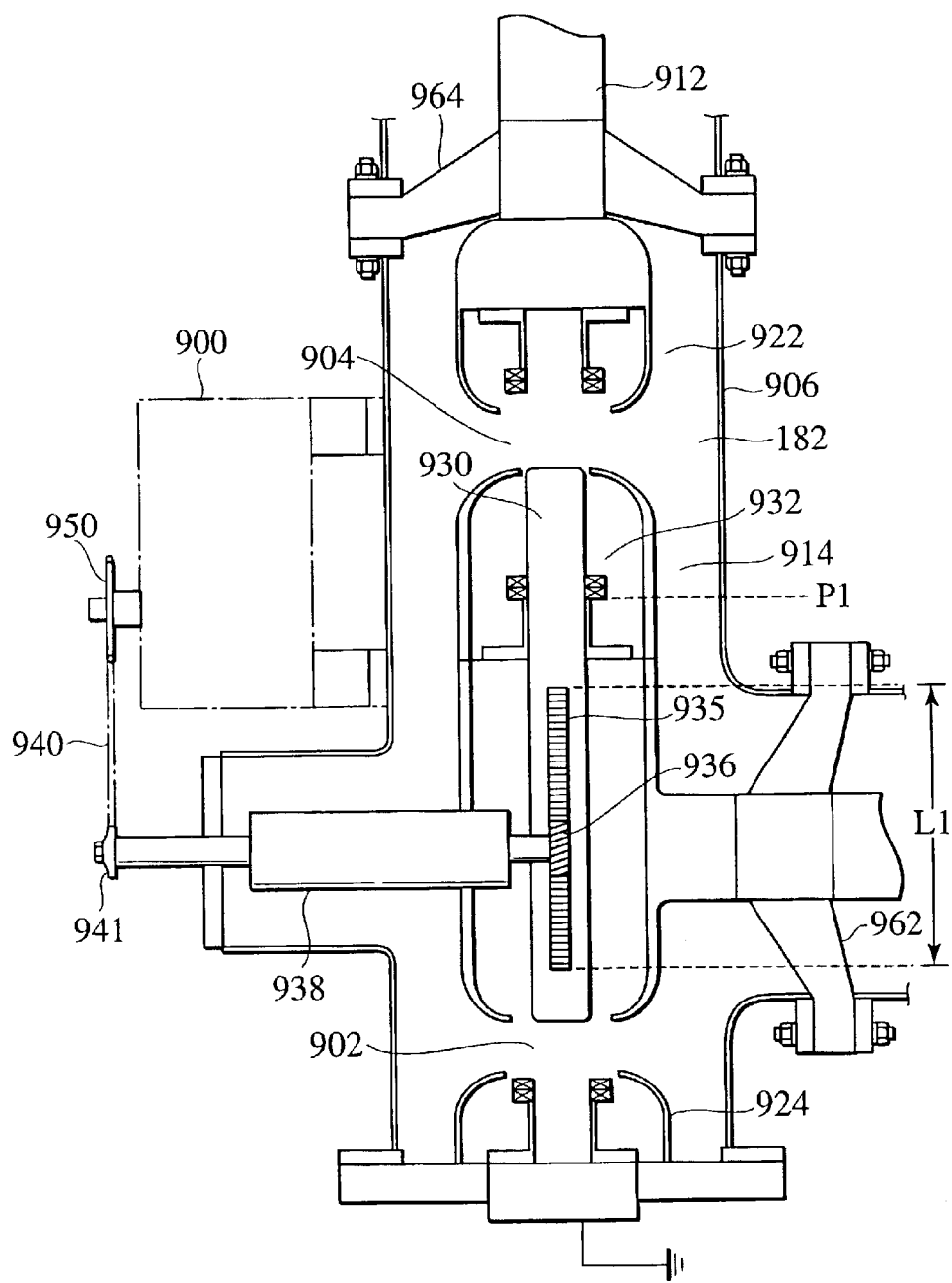
FIG. 17 is a sectional view of a three-position earth disconnecting switch employed in a gas-insulated switchgear embodying the present invention.
Figure 18:
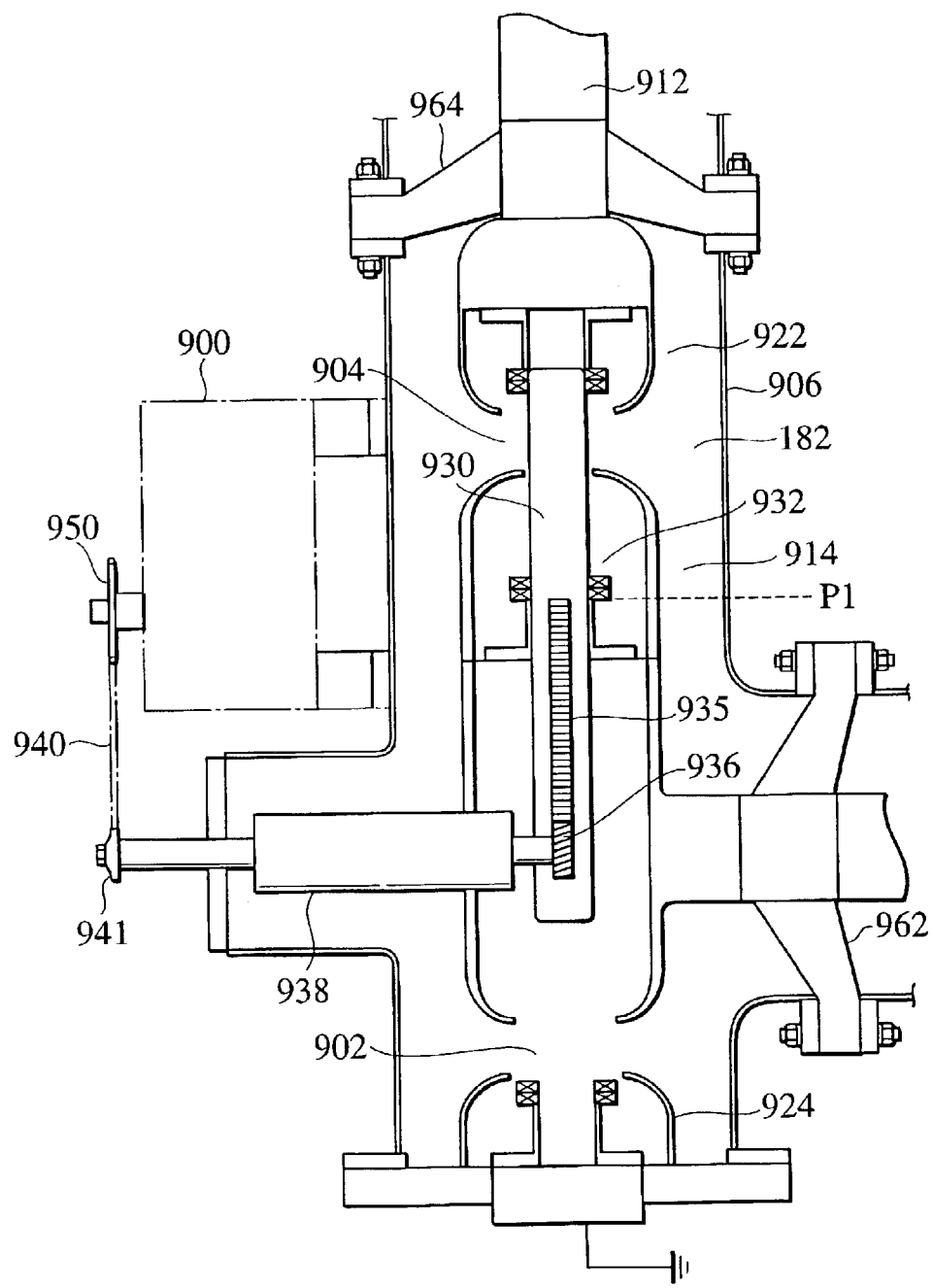
FIG. 18 is a sectional view of a three-position earth disconnecting switch employed in a gas-insulated switchgear embodying the present invention.
Figure 19:
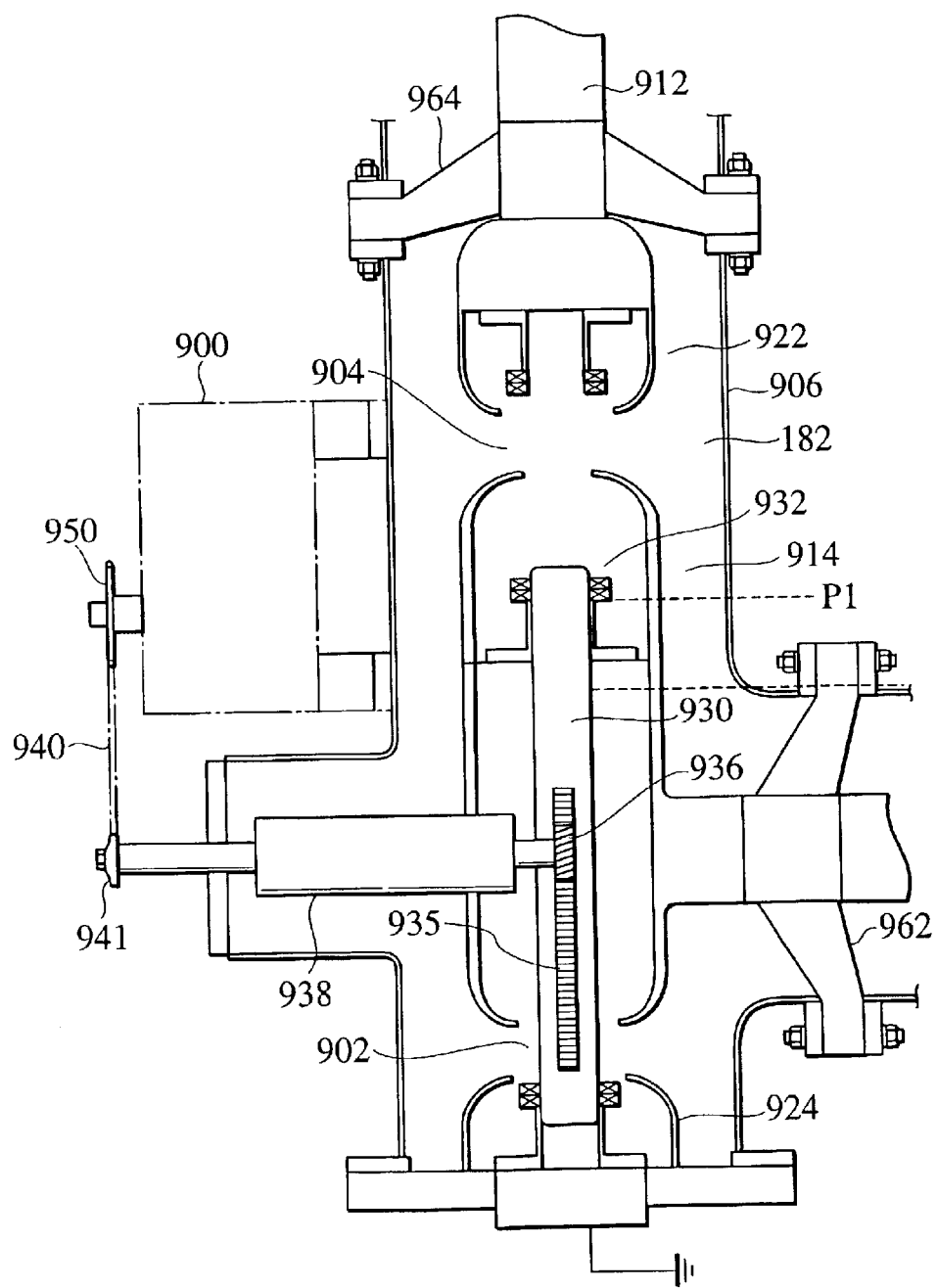
FIG. 19 is a sectional view of a three-position earth disconnecting switch employed in a gas-insulated switchgear embodying the present invention.

FIGS. 16 and 17 are sectional views of an EDS, i.e., the EDS 182 shown in FIG. 4 in this case, and associated parts. FIGS. 18 and 19 are sectional views of assistance in explaining the operation of the EDS 182 shown in FIG. 17. An operating unit including an electric motor drives a power transmission mechanism for operating an insulating rod for operating the EDS by a chain.

Referring to FIGS. 16 to 19, the EDS 182 is provided with an earth switch 112 and a disconnecting switch 904. The earth switch 112 and the disconnecting switch 904 are contained in a grounded vessel 906 filled with an insulating gas. A first conductor 912 and a second conductor 914 are disposed in the container 906. The disconnecting switch 904 has a stationary collector 922. The earth switch 902 has a stationary collector 924. A movable contact conductor 930 included in the second conductor 914 is moved to place the disconnecting switch 904 selectively in one of three states, namely, an on-state, an off-state and an earthing-state. A contact member 932 is formed of a conducting material and is capable of being electrically connected to the stationary collector 922. The movable contact conductor 930 is provided with a rack 935, and a pinion 936 mounted on an insulating rod 938 is engaged with the rack 935. The insulating rod 938 is interlocked with an operating unit 900 by a driven sprocket 941, a chain 940 and a drive sprocket 950. The operating unit 900 drives the insulating rod 938 to drive the movable contact conductor 930 mechanically.

The second conductor 914 is provided with the contact member 932. The movable contact conductor 930 for connecting the contact member to the stationary collector 922 or 924 is slidably placed in the contact member 932. The stationary collector 922 for the disconnecting switch 904, and the stationary collector 924 for the earth switch 902 are disposed opposite to the opposite ends of the movable contact conductor 930, respectively. The stationary collector 924 is earthed. The movable contact conductor 930 is provided with the rack 935. The stationary collector 922, the movable contact member 932, the second conductor 914, and the movable contact conductor 930 placed in the second conductor 914 are arranged coaxially. A conductor extending perpendicularly to the second conductor 914 is fixedly held by an insulating spacer 962. The conductor perpendicular to the second conductor 914 serves as a sealing structure for sealing conductive particles that may be produced when the pinion 936 drives the rack 935, and the movable contact conductor 930 and the movable contact member 932 slide in the vessel of the second conductor 914 in which the movable contact conductor 930 moves to prevent the conductive particles from entering a space where a high electric field is created. The rack 935 of the movable contact conductor 930 is formed in a length L1 such that the rack 935 does not come into contact with the contact member 932 when the movable contact conductor 930 is driven by the pinion 936 and brought into contact with the stationary collector 922. The contact member 932 is disposed at a position P1 at a distance longer than the length L1 from the position of the pinion 936 to prevent the contamination of the contact member 932 with foreign particles produced by the pinion 936 and the rack 935. Since the contact member 932 is thus protected from contamination, foreign particles produced by the pinion 936 and the rack 935 do not spread when the movable contact conductor 930 is moved, and the spread of conductive foreign matters produced when the movable contact conductor 930 and the contact member 932 are driven for sliding movement by the pinion 936 and the rack 935 into the space where a high electric field is created.

In the EDS included in this embodiment, the contact member 932 is disposed so that any foreign matters may not be produced by interference between the rack 935 placed on the movable contact conductor 930 and the contact member 932, and the collector of a single contact member is used as the contact members of both the disconnecting switch 904 and the earth switch 902. Thus, the contact member 932 and the rack 935 do not produce any foreign matters. Since the contact member 932 surrounds the movable contact conductor 930 closely, current density on the contact member 932 is low.

Since the contact member 932 is disposed on the side of the disconnecting switch 904 with respect to the second conductor 914, current flows from the second conductor 914 via the contact member 932, the movable contact conductor 930, and the stationary collector 922 to the first conductor 912. Thus, current flows from the second conductor 914 through the shortest path to the first conductor 912 and, consequently, Joul heat which is evolved when current flows from the second conductor 914 to the first conductor 912 can be reduced.

FIG. 18 shows the EDS 182 in a state where the movable contact conductor 930 has been brought into electrical contact with the stationary collector 922 of the disconnecting switch 904, and the disconnecting switch 904 is in the on-state. In the state shown in FIG. 18, the rack 935 is not in contact with the contact member 932 and hence the contact member 932 is not contaminated with foreign matters produced by the rack 935, so that the foreign matters are unable to spread through the contact member 932 into other parts of the movable contact conductor 930. Consequently, a controlled rated current is able to flow from the second conductor 914 to the first conductor 912.

FIG. 19 shows the EDS 182 in a state where the movable contact conductor 930 has been brought into electrical contact with the stationary collector 924 of the earth switch 902, and the earth switch 902 is in the on-state, namely, an earthing state. In the state shown in FIG. 19, the rack 935 is not in contact with the stationary collector 924 and hence the stationary collector 924 is not contaminated with foreign matters produced by the rack 935, so that the foreign matters are unable to spread through the stationary collector 924 into other parts of the movable contact conductor 930. Consequently, in the bay unit No. 2 shown in FIG. 4, the earth switch 902 is closed to earth the second conductor 914, so that any charges are not accumulated in the bay unit No. 2.

In an EDS 700, the earth switch cannot be closed unless the disconnecting switch is opened. Thus, the earth switch and the disconnecting switch are interlocked mechanically.

The insulating rod 938 is extended perpendicularly to a line on which the second conductor 914, the disconnecting switch 904 and the earth switch 902 are arranged. The insulating rod 938 has one end projecting outside from the vessel 906. Gaps between the insulating rod 938 and the vessel 906 are sealed in an airtight fashion by a rotary seal to prevent the leakage of the insulating gas and to reduce friction. The rotation of the insulating rod 938 is converted into a linear motion of the movable contact conductor 930 by the rack-and-pinion mechanism consisting of the rack 935 and the pinion 936.

Figure 20:
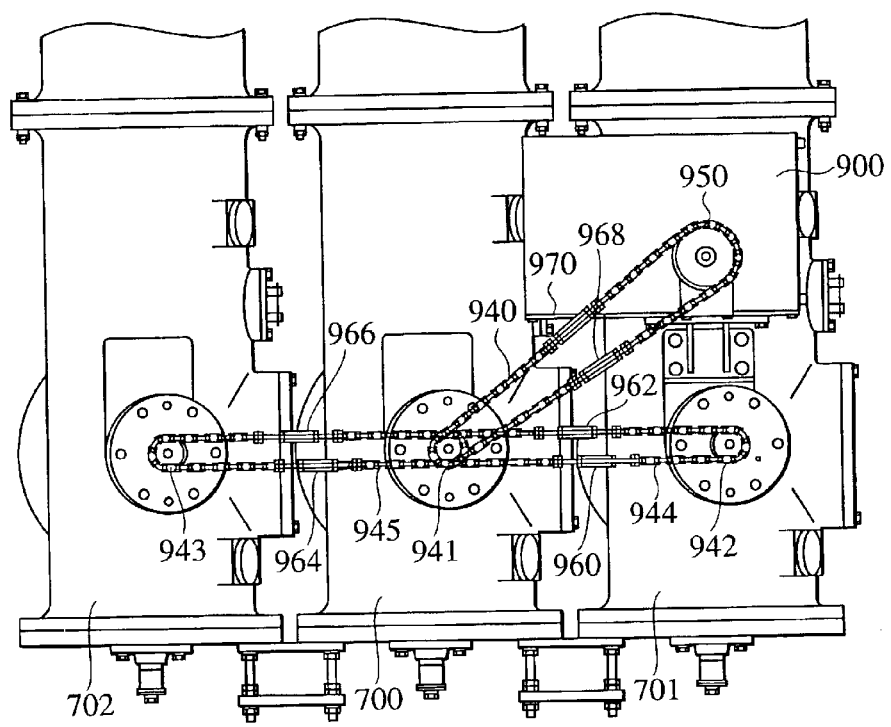
FIG. 20 is a front elevation of a three-position earth disconnecting switch unit including three three-position earth disconnecting switches arranged in a parallel arrangement and employed in the gas-insulated switchgear embodying the present invention.

FIG. 20 is front elevation of a three-position EDS unit including three three-position EDSs arranged in a parallel arrangement and employed in the GIS embodying the present invention.

A chain 944 is extended between a driven sprocket 941 mounted on the insulating rod of a three-position EDS for a first phase and a driven sprocket 942 mounted on the insulating rod of a three-position EDS for a second phase to rotate the driven sprockets 941 and 942 in the same direction. A chain 945 is extended between the driven sprocket 941 of the EDS for the first phase and a driven sprocket 943 mounted on the insulating rod of a three-position EDS for a third phase. A chain 940 is extended between the driven sprocket 941 of the EDS for the first phase and a drive sprocket 950 mounted on the output shaft of the electric motor, not shown, included in the operating unit 900. The electric motor is driven according to a control signal given to the operating 900. The rotation of the drive sprocket 950 is transmitted to the driven sprocket 941. Thus, the sprockets driven 941, 942 and 943 rotate in the same direction, so that the insulating rods of the EDSs are rotated, and the movable contact conductors of the EDSs for the three phases are moved vertically and simultaneously by the rack-and-pinion mechanisms each consisting of the rack and the pinion.

Figure 21:
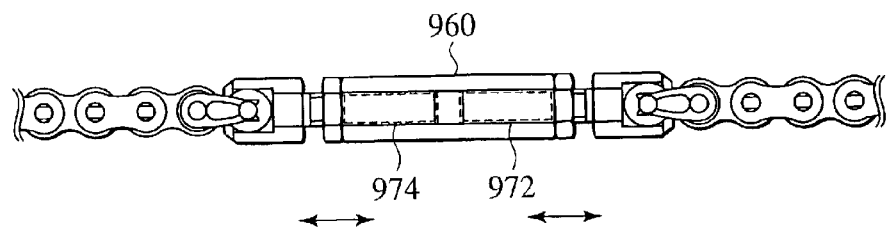
FIG. 21 is a side elevation of a turnbuckle included in the three-position earth disconnecting switch unit shown in FIG. 20.

Turnbuckles 960 and 962, turnbuckles 964 and 966, and turnbuckles 968 and 970 are placed in the opposite sides of the chains 944, 945 and 940, respectively. FIG. 21 shows the turnbuckle 960 by way of example. The turnbuckle 960 has a sleeve provided with screw threads of opposite hands at the opposite ends thereof, respectively, and bolts 972 and 974 screwed in the opposite threaded ends of the sleeve, respectively. The sleeve of the turnbuckle 960 is turned in a desired direction to increase or decrease the length thereof by increasing or decreasing the distance between the bolts 972 and 974. The turn buckles are placed in the opposite sides, respectively, of each of the chains 944, 945 and 940. Therefore, for example, the movable contact conductors of the EDSs for the first and the second phase can be properly positioned by decreasing the length of the turnbuckle 960 and increasing the length of the turnbuckle 962 or by increasing the length of the turnbuckle 960 and decreasing the turnbuckle 962 with the sprocket 941 fixed to adjust the angular position of the sprocket 942 relative to that of the sprocket 941. Similarly, the lengths of the turnbuckles 964 and 966 of the chain 945, and the length of the turnbuckles 968 and 970 of the chain 940 are adjusted to adjust the respective angular positions of the sprockets 941, 942, 953 and 950 properly. Thus, the respective positions of the movable contact conductors of the EDSs for the three phases can be easily adjusted so that the disconnecting switches of all the EDSs can be synchronously closed or opened, and the earth switches of all the EDSs can be synchronously closed or opened.

The diameter of the drive sprocket 950, and the diameters of the driven sprockets 941, 942 and 943 are determined properly, such that the movable contact conductors of the EDSs can be vertically moved between their top positions and the bottom positions without turning the chains 944, 945 and 940 one full turn and the turnbuckles of the chains may not interfere with the sprockets 950, 941, 942 and 943, respectively. The lengths of the chains can be adjusted by the turnbuckles.

Although the EDSs of the bay unit No. 4 have been described as an example of the bay unit provided with a plurality of EDS units, the EDSs for the three phases may be arranged longitudinally and laterally instead of arranging the same as mentioned above.

The GIS in the foregoing embodiment uses $SF_6$ gas as the insulating gas sealed in the bus duct, a mixed gas prepared by mixing one or some of $N_2$, $CO_2$, $CF_4$ and $O_2$, and $SF_6$ may be used instead of the $SF_6$ gas. If working condition requires, the bus duct may be evacuated in a vacuum.

As apparent from the foregoing description, the specified bay unit among the bay units of the GIS is moved to facilitate work for the maintenance of the GIS.

While the invention has been described in its preferred embodiments, it is to be understood that the words which have been used are words of description rather than limitation and that changes within the purview of the appended claims may be made without departing from the true scope and spirit of the invention in its broader aspects.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A gas-insulated switchgear comprising: a first three-phase bus, a second three-phase bus, and a plurality of circuit breakers;
    wherein bay units are formed for the circuit breakers, respectively, the first and the second three-phase buses are each contained in first and second bus ducts which are respectively included in corresponding bay units, and
    the bus ducts of the adjacent bay units are connected by bellows expansion joints, respectively,
    wherein the first and second three-phase buses are provided separately and a plurality of bay units, each of which have gas-insulated circuit breakers and earth disconnecting switches, are arranged between and along the first and second three-phase buses.

2. The gas-insulated switchgear according to claim 1, wherein, when the bay unit is to be separated, bellows expansion joints connected to the bus ducts of the bay unit are contracted.

3. The gas-insulated switchgear according to claim 2, wherein a circuit breaker of the bay unit is mounted on a base, and the bay unit is separated with the circuit breaker mounted on the base.

4. The gas-insulated switchgear according to claim 2, wherein branch busbars are extended vertically and horizontally from the bus duct of the bay unit containing the three-phase bus connected to the other bay units.

5. The gas-insulated switchgear according to claim 2, wherein a three-position earth disconnecting switch is placed in a path of a bus conductor for connecting the first or the second three-phase bus and the circuit breaker included in the bay unit.

* * * * *